May 2, 1944.  H. A. HOKE ET AL  2,348,007
WATER LEVEL GAUGE
Filed Nov. 10, 1942   3 Sheets-Sheet 2
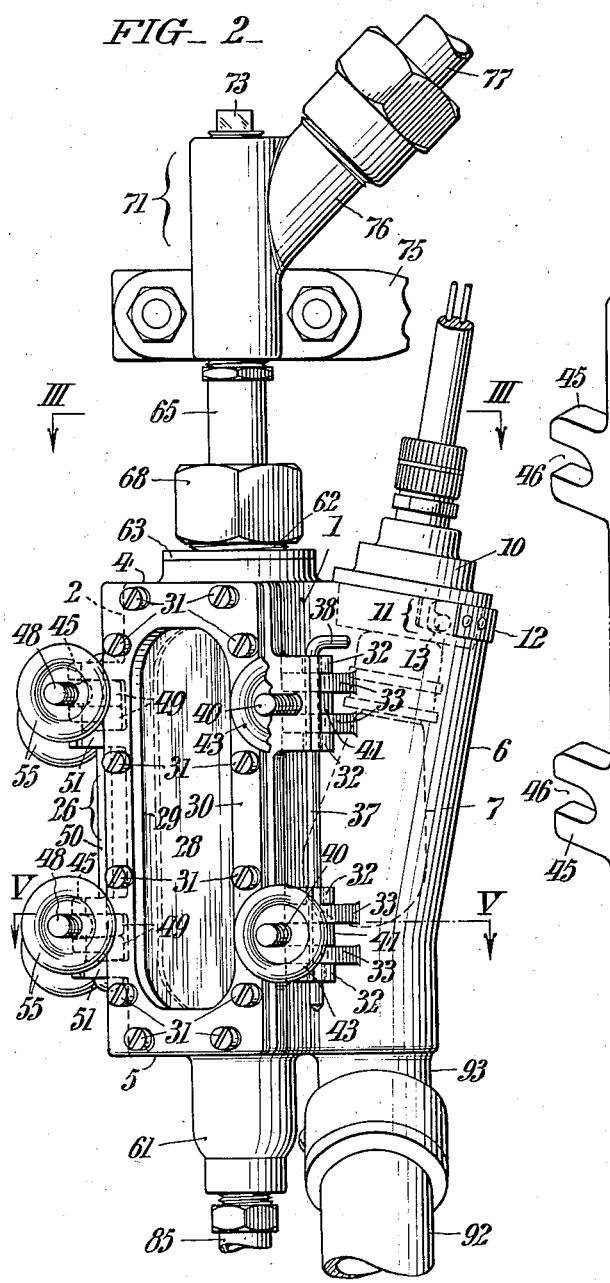
FIG_2_
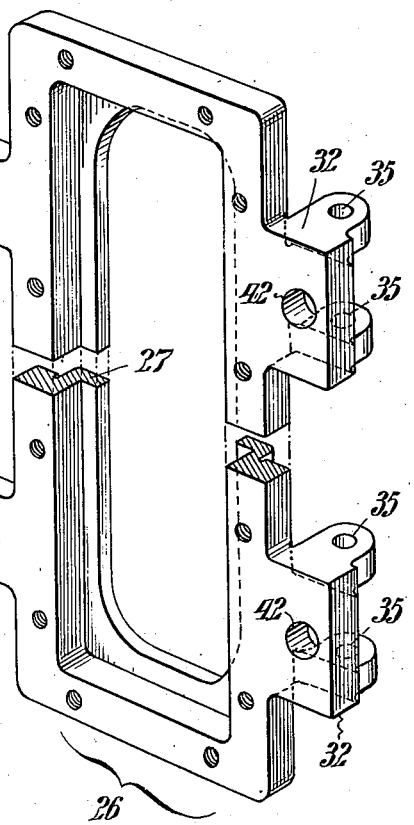
FIG_8_
WITNESSES:
John C. Bergner
Hubert Fuchs
INVENTORS:
Harry A. Hoke &
Clarence J. Barley,
BY Paul & Paul
ATTORNEYS.

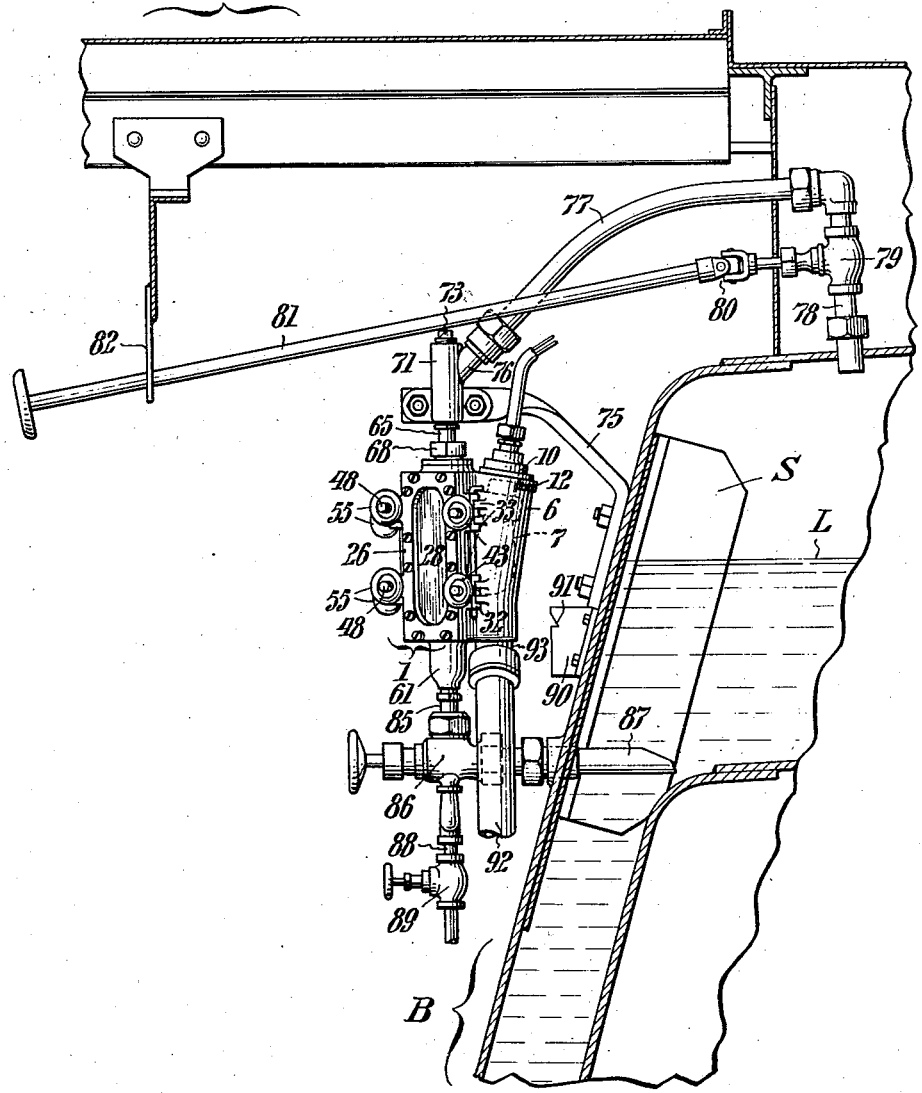

May 2, 1944.  H. A. HOKE ET AL.  2,348,007
WATER LEVEL GAUGE
Filed Nov. 10, 1942   3 Sheets-Sheet 3
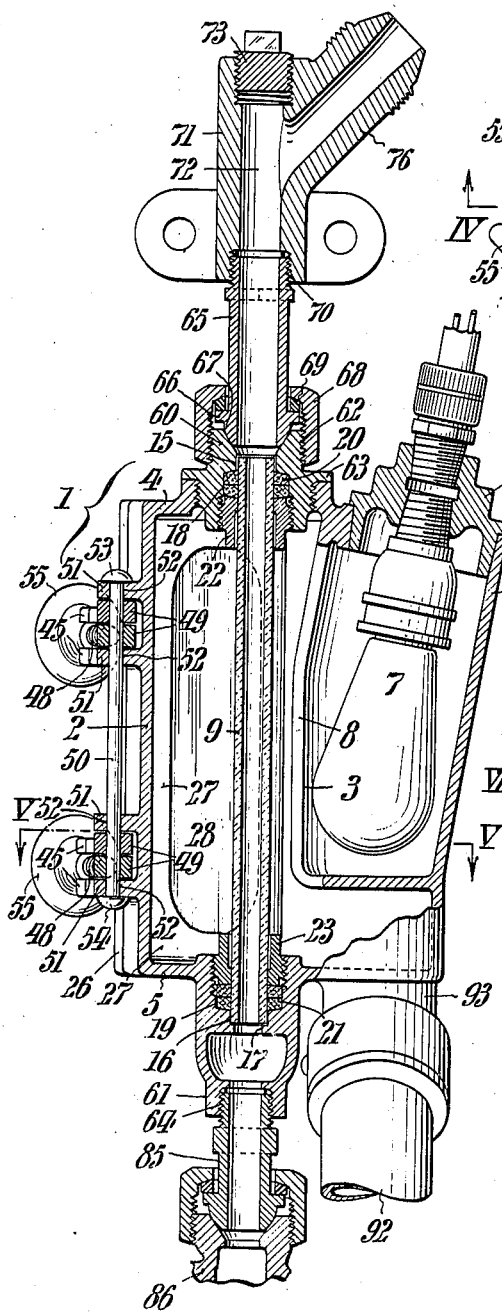
FIG. 4.
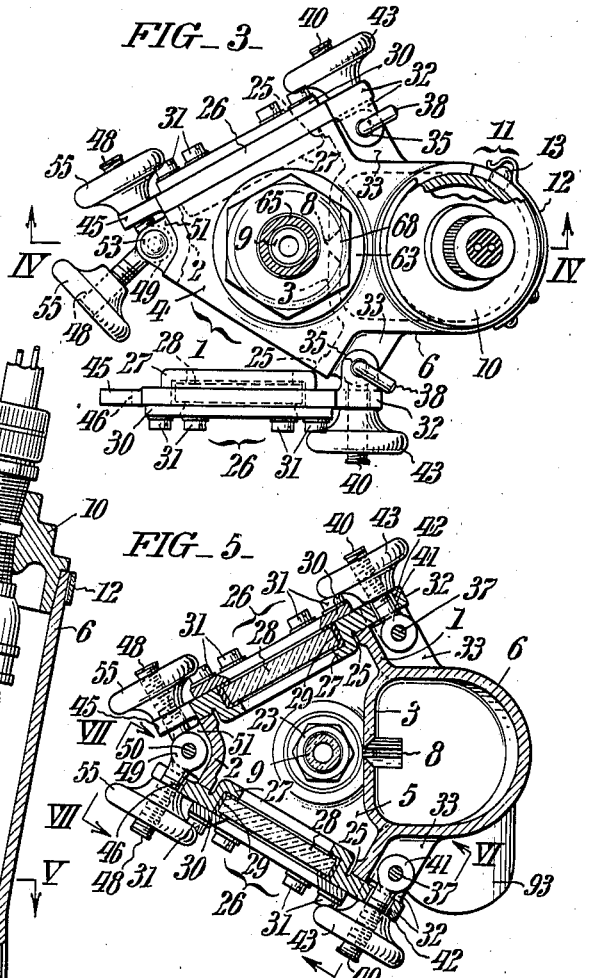
FIG. 3.
FIG. 5.
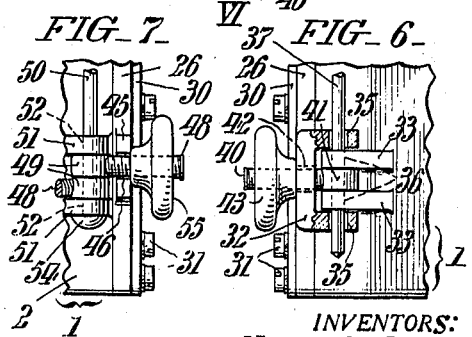
FIG. 7.   FIG. 6.
INVENTORS:
Harry A. Hoke &
Clarence J. Barley,
BY
Paul Paul
ATTORNEYS.

Patented May 2, 1944

2,348,007

UNITED STATES PATENT OFFICE 2,348,007

WATER LEVEL GAUGE

Harry A. Hoke, Altoona, and Clarence J. Barley, Rosemont, Pa., assignors to The Pennsylvania Railroad Company, Philadelphia, Pa., a corporation of Pennsylvania Application November 10, 1942, Serial No. 465,128

7 Claims. (Cl. 73—293)

This invention relates to water level gauges for steam boilers and the like. More specifically it has reference to water level gauges for locomotive boilers, of the type wherein the sight tube is housed within a protective casing, and wherein such casing is provided with a hinged door or doors having transparent panels through which the water level in the tubes can be observed.

In connection with gauges of the particular kind referred to, we aim to enable replacements of the sight tubes to be made easily and quickly without necessitating disassembling or dismounting of the gauges, and to make it possible to secure the doors with assurance of absolute steam-tightness with a view toward precluding injury to the engineer or boiler attendant by escaping boiling water and/or steam in the event of breakage of the sight tubes of the gauges.

One way in which the foregoing and other important objects and practical advantages are realized in practice will appear from the following detailed description of the attached drawings; wherein Fig. 1 is a fragmentary view in longitudinal section of the rear end of a locomotive boiler wherewith is associated a water level gauge conveniently embodying our invention.

Fig. 2 is a view on a larger scale showing the gauge in side elevation.

Fig. 3 is a horizontal section indicated by the angled arrows III—III in Fig. 2, and showing the gauge in plan with a portion thereof broken away to expose an important structural detail, and with one of the doors of the protective casing in open position.

Fig. 4 is a vertical axial section through the gauge taken as indicated by the angled arrows IV—IV in Fig. 3.

Fig. 5 is a horizontal sectional view taken as indicated by the angled arrows V—V in Figs. 2 and 4.

Figs. 6 and 7 are fragmentary detail views taken as indicated by the angled arrows VI—VI and VII—VII in Fig. 5; and Fig. 8 is a broken-out perspective view of the frame of one of the doors of the protective casing.

As shown in these illustrations, our improved water level gauge has a protective casing 1 which is triangular in plan and in which the front and rear side walls 2 and 3 are integrally continuous with the top and bottom walls 4 and 5. The casing is moreover formed with a rearward offset 6 for the accommodation of an electric bulb 7 from which the light passes through a vertical slit 8 (Figs. 4 and 5) in the rear wall 3 to illuminate the transparent sight tube 9 axially within the casing from behind. From Figs. 2–4 it will be seen that the bulb 7 is socketed into a shouldered cap 10 which closes the top of the offset 6 and which is secured by bayonet lock means at 11. A segmental leaf spring 12 riveted at one end to the offset 6 at the outside has its other end recessed to engage the stud member 13 of the bayonet lock means 11 projecting laterally from the cap 10 to hold the latter against accidental displacement. As shown in Fig. 4, the sight tube 9 has its ends engaged within axially-aligned vertical bores 15 and 16 respectively in the top and bottom walls 4 and 5 of the casing 1, the bore 16 being shouldered at 17 to provide a seat for the lower end of said tube. The bores 15 and 16 are moreover enlarged at their inner ends as at 18 and 19 respectively for reception of packings 20 and 21 which surround the ends of the sight tube 9, said packings being compressed and held in place by means in the form of gland nuts 22 and 23 which are screwed into the bore enlargements from within the casing 1.

At its sides, the casing 1 has rectangular openings 25 whereof the outer perimetric faces are machined, and hinged covers or doors whereof the frames 26 are respectively recessed inwardly as at 27 for reception of transparent panels 28 through which the sight tube 9 can be observed, and whereof the inner marginal faces are machined to bear snug and steam-tight against the machined perimetric faces of said openings. The panels 28 are held in place, with interposition of packing strips 29 around their edges, by rectangular keeper elements 30 secured by screws 31.

The hinge construction for each door 26 includes a pair of lugs 32 which are spaced vertically of one edge of the door frame 26 and which are clevised to engage over correspondingly-spaced clevised ears 33 projecting from the casing adjacent the contiguous edge of the door opening 25. The lugs 32 and ears 33 have aligning vertical apertures 35 and 36 respectively through which a pintle 37 passes, said pintle being removable from above and having its upper end bent laterally as at 38 in Figs. 2 and 3 for retainment in the assembly. For a reason later on explained, the apertures 35 in the lugs 32 are of a diameter to clear the pintle 37 by a considerable margin. Each hinge structure further includes a pair of bolts 40 with eyes 41 which engage the pintle 37 within the clevises of the ears 33, the shanks of said bolts being threaded and passing, with liberal clearance, through lateral apertures 42 in the lugs 32 at the contiguous edges of the door frame. Respectively associated with the bolts 40 are thumb nuts 43 which tighten against the outer faces of the lugs 32 on the door frame 26. At its swinging edge each door 26 is provided with vertically spaced lugs 45 having notches 46 of a width to freely receive the shanks of securing bolts 48 like the bolts 40 embodied in the hinge means. As shown, the eyes 49 of the bolts 48 engage a vertical pintle 50 within the clevises of split ears 51 on the front wall 2 of the casing, said pintle passing with a snug fit through aligned apertures 52 in said ears and being headed at opposite ends as at 53 and 54 for permanent retainment. Engaged on the threaded shanks of the bolts 48 are thumb nuts 55 which are adapted to bear against the outer faces of the lugs 45. For the purposes of structural simplicity, the pintle is made to serve for the securing bolts 48 of both doors 26.

By reason of the looseness of the connections of the doors 26 at the hinge pintles 37, it will be seen that said doors are free to adapt themselves to the facings of the door openings in the casing 1, with the result that when the thumb nuts 43 and 55 are drawn up tight, fluid-tight seals are formed to prevent the escape of hot water and/or steam in the event that the sight tube should break, and thereby safeguard the engineer or attendant of the boiler from possible injury.

At the top and bottom, the casing 1 is provided with bosses 60 and 61 respectively in axial alignment with the sight tube 9, the boss 60 being externally threaded as at 62 and formed as an integral continuation of a screw cap 63 which in this instance constitutes a removable portion of the top wall 4 of said casing and which provides the bore 15 for said tube, while the boss 61 is internally threaded as at 64. A nipple 65 whereof the lower end has a circumferential flange 66 and is coned as at 67 to engage a correspondingly configured seat at the top of the boss 60, is held in place by a nut 68 engaging the threads of said boss, the packing shown at 69 insuring water-tightness. The upper end of the nipple 65 is threadedly engaged at 70 in the bottom of a fitting 71 whereof the vertical bore 72 is in turn continuous with the tubular extension 65 and is closed at the top by a screw plug 73. The fitting 71 is supported by a bracket 75 bolted to the rear end of the locomotive boiler B in Fig. 1 and formed with an upwardly inclined nipple 76 for connection of piping 77 which extends from the top of said boiler.

Interposed in a vertical branch 78 of the piping 77 is a valve 79 whereof the stem is connected, by a universal coupling 80, to an operating rod 81 whereof the outer end is supported by a hanger 82 suspended from the top of the locomotive cab C. In turn screwed into the bottom boss 61 of the casing 1 is a nipple 85 for attachment of an angle valve 86 (Fig. 1) from which horizontal piping 87 leads directly into the boiler B well below the normal water level L adjacent the surge counteracting baffle indicated at S. A small drain pipe 88 leads downward from the angle valve 86 and is itself provided with a hand valve 89, which is normally kept closed while the valves 79 and 86 are normally kept open to allow the water to pass through the sight tube 9 of the gauge. An angle piece 90 secured to the rear end of the boiler B has a notch 91 in its projecting edge which marks the low water level of the water in the boiler and which is used as a guide to set the gauge at the proper height when it is initially installed or when it is replaced after having been dismantled in the event that repairs are necessary.

Due to the above described unique construction of the gauge, it is possible to renew the sight tube 9 in case of breakage without disassembling the gauge or removing it from the boiler, by the following procedure:

The valves 79 and 86 are first closed to stop the steam and water flow through the gauge. With this accomplished, one of the doors 26 is opened for access to the packing gland nuts 22 and 23 within the casing, and said nuts backed off to relieve the packings 20 and 21. If the tube 9 is shattered, the broken parts can be then removed directly from the interior of the casing. On the other hand, if the sight glass 9 should be merely split or fractured, it can be withdrawn upwardly through the nipple 65 and the vertical bore 72 of the fitting 71 upon removal of the plug 73 at the top of said bore. To install a new sight tube, the procedure is simply reversed, that is to say, the new tube is inserted from above through the vertical bore 72 of the fitting 71 and drawn down into the casing 1 through the nipple 65 until its lower end rests on the seat 17 in the bottom wall 5 of said casing. Finally, the gland nuts 22 and 23 are tightened to compress the packings 20 and 21, the door 26 closed and made secure, and the screw plug 73 inserted into the top of the fitting 71; whereupon the valves 79 and 86 are opened to let in the steam and water from the boiler. Upon failure of the sight tube 9, the water and/or the steam collecting in the casing 1 is led off to a point beneath the locomotive cab C by way of a conduit 92 which connects at 93 into the bottom of the offset 6 of said casing.

Having thus described our invention, we claim:

1. In a water level gauge, a vertical sight tube; a surrounding protective casing triangular in cross-section and having a side opening, in a front wall, a door for said opening having a transparent panel, a hinge structure loosely connecting one edge of the door to the casing, with capacity for limited play to insure full seating of the door against the edges of the opening and incorporating means for drawing up the door after closing, and releasable means on the casing for similarly drawing up the swinging edge of the door after closing for assurance of steam tightness all around.

2. The invention according to claim 1, in which the casing has vertically-aligned bores in its top and bottom walls to receive the ends of the sight tube, and a removable closure means at its upper end through which the tube can be withdrawn and replaced in the event of breakage.

3. The invention according to claim 1, in which the casing has vertically-aligned bores in its top and bottom walls to receive the ends of the sight tube, and a removable closure means at its upper end through which the tube can be withdrawn and replaced in the event of breakage; in which packings circumferentially seal the ends of the sight tube in the bores; and in which the packings are accessible from within the casing upon opening of the door for compressing and securing said packings.

4. The invention according to claim 1, in which the casing has an offset beyond its rear wall for the accommodation of a light bulb, and a vertical slit in said rear wall in line with the sight tube 5. The invention according to claim 1, in which the releasable securing means includes eye bolts which are respectively pivoted on the casing for capacity to be swung into notches in the swinging edge of the door, and clamp nuts which are in threaded engagement respectively with the protruding ends of the eye bolts to bear on the outer face of the door.

6. The invention according to claim 1, in which the hinge structure includes eye bolts which are pivotally supported respectively on the casing and which have their shanks passing loosely through apertures in the corresponding side edge of the door, and clamp nuts respectively in threaded engagement with the protruding ends of bolt shanks to bear on the outer face of said door.

7. In a water level gauge for steam boilers and the like, a vertical sight tube; an enclosing protective casing having a side opening therein; a door for the side opening; hinge means for the door including a pintle supported at one side edge of the door opening, a lug at the contiguous edge of the door with a vertical aperture to loosely engage the pintle thereby to permit the door to bear fully against the edge margin of the door opening; and means for securing the door in fluid-tight relation with the casing including an eye bolt pivoted on the hinge pintle with its shank extending loosely through an aperture in said lug, a similar bolt pivotally supported in a like manner at the opposite side edge of the door opening for capacity to be swung into a notch in the swinging edge of the door, a clamp nut threadedly engaging the protruding end of the first mentioned bolt to bear against the outer face of the door, and a clamp nut on the last mentioned bolt to bear against the outer face of said door.

HARRY A. HOKE.
CLARENCE J. BARLEY.